United States Patent [19]

Klein

[11] 4,330,222
[45] May 18, 1982

[54] IRRIGATION MEANS AND METHOD

[76] Inventor: Heinz E. O. Klein, 11 Kraegen St., Alice Springs, Northern Territory, Australia

[21] Appl. No.: 141,108

[22] Filed: Apr. 17, 1980

[30] Foreign Application Priority Data

Apr. 19, 1979 [AU] Australia .............................. PD8472

[51] Int. Cl.³ ............................................ E02B 13/00
[52] U.S. Cl. ........................................ 405/48; 405/43
[58] Field of Search ....................... 405/36, 43, 44, 45, 405/46, 47, 48; 239/542

[56] References Cited

U.S. PATENT DOCUMENTS 3,220,194 11/1965 Lienard .................................. 405/45
3,403,519 10/1968 Balko ..................................... 405/45
4,057,500 11/1977 Wager ............................... 405/43 X

FOREIGN PATENT DOCUMENTS 478962 9/1969 Switzerland ........................ 405/45

Primary Examiner—David H. Corbin
Attorney, Agent, or Firm—Jay L. Chaskin

[57] ABSTRACT

An underground watering system having a water distribution pipe and at least one strainer box over the water distribution pipe, the strainer box containing gravel or other particulate matrial, and the distribution pipe having a water emitting aperture which is located within the strainer box, so that water is discharged into the particulate material.

4 Claims, 3 Drawing Figures

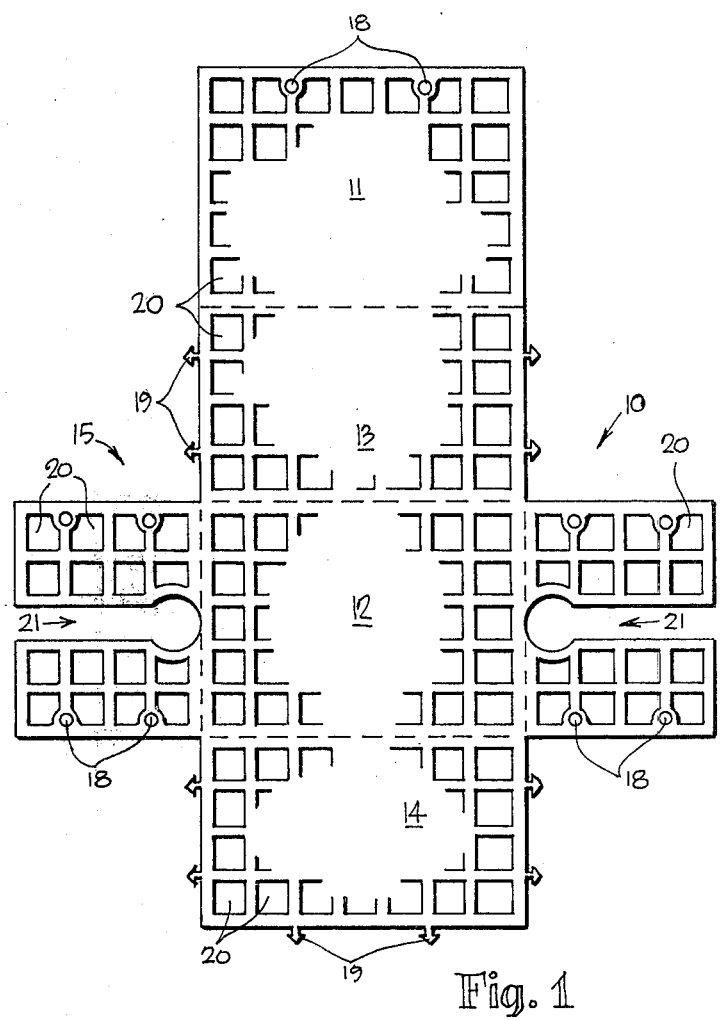

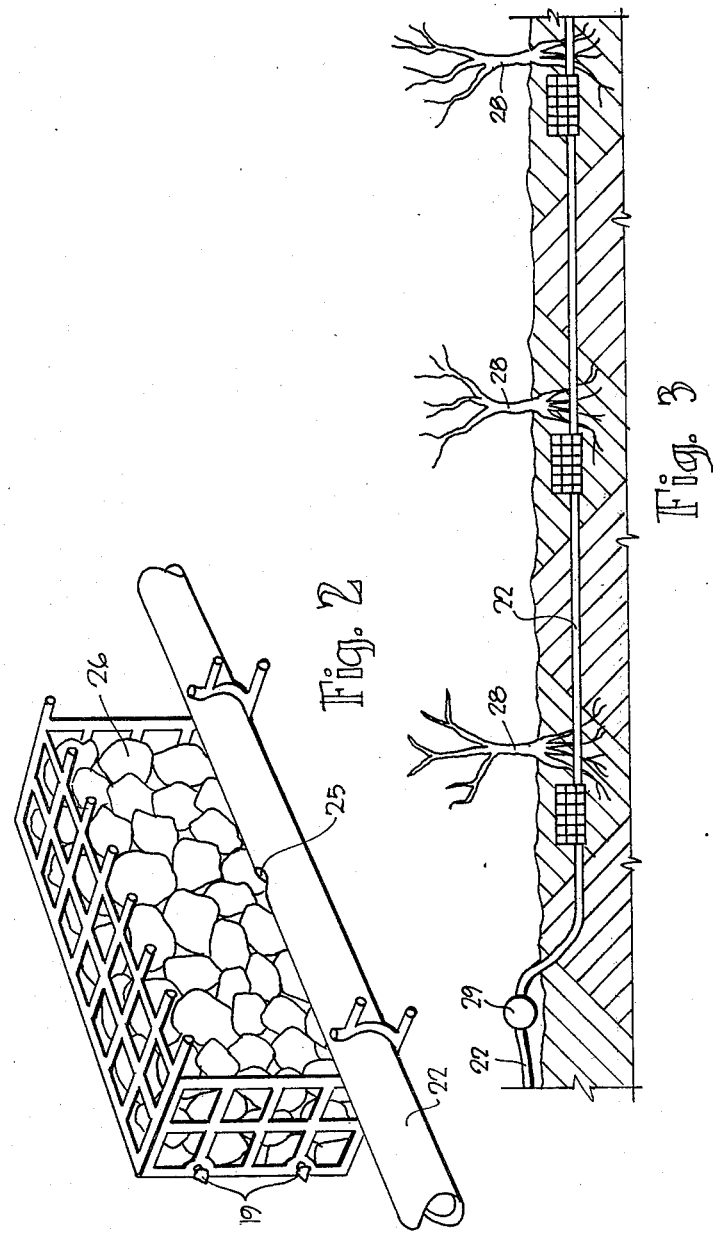

IRRIGATION MEANS AND METHOD

This invention relates to a multiple means and method for the irrigating of plants.

BACKGROUND OF THE INVENTION

At the present time there are three main methods of irrigation which are in common use. The oldest and best known method of irrigation is so called "flood" irrigation wherein relatively large quantities of water are flooded onto the ground adjacent plants, the water soaking into the ground but carrying with it many salts, some of which are harmful.

A second type of irrigation which is commonly used is spray irrigation, and although this uses less water and therefore causes less salt damage, the spray irrigation system is subject to large evaporation loss, and in some instances the spray droplets can damage foliage.

To reduce the damage to foliage and to more effectively direct irrigating water, use has been made of drip irrigation systems. However, a build up of algae and solidification of minerals sometimes causes drop emitters to be blocked and can also cause a change in the pH balance of the irrigating water. Other particles can also cause blockage of drip emitters, and for that reason filters are often deemed necessary. Even with the use of filters however, drip emitters need to frequently be cleaned or adjusted or changed. Another difficulty with drip emitters is that they emit such small quantities of water that considerable time is taken to effect an irrigation cycle. A still further problem is that the water distribution pipes are usually located above the ground and liable to damage and deterioration.

The object of this invention is to provide a novel method of irrigating, a novel irrigation system, novel irrigation means and a novel strainer box which can be used in the system, wherein some at least of the above-mentioned difficulties are obviated.

BRIEF SUMMARY OF THE INVENTION

Briefly in this invention there is provided an underground watering system having a water distribution pipe and at least one strainer box over the water distribution pipe, the strainer box containing gravel or other particulate material, and the distribution pipe having a water emitting aperture which is located within the strainer box, so that water is discharged into the particulate material.

More specifically, in this invention a strainer box useful for the containing of particulate material in an underground irrigating system comprises walls defining a container, the walls comprising strands, said strands intercepting at cross-over points to form mesh, but the strands of at least two pairs of strands being spaced apart to define respective slots, two slots extending into opposite walls of the container and being of such size and shape as to locate the strainer box over a water distribution pipe.

The particulate material can be gravel which is relatively inert and which is not subject to penetration by plant root systems as much as some other particulate material. The container walls can be constituted by a unitary moulding of polymeric material which is moulded in flat form, and subsequently folded to provide the container configuration.

The invention can further comprise irrigating means having a water distribution pipe, an outlet aperture in the wall of the pipe, a strainer box as above-defined located over that portion of the pipe which contains the outlet aperture, and particulate material in the strainer box such that water issuing from the outlet aperture percolates through the particulate material.

Further in the invention, an irrigation system can comprise a water distribution pipe, a plurality of outlet apertures in the wall of the pipe, each outlet aperture within a respective strainer box being as defined above, and each strainer box being at least partly buried in the ground.

It will be clear therefore that the invention also extends to a method of irrigating, and the method comprises at least partly burying in the ground the plurality of strainer boxes and the water distribution pipe of an irrigation system as defined above, and discharging water through the outlet apertures into the particulate material in respective strainer boxes.

BRIEF DESCRIPTION OF THE DRAWINGS

An embodiment of the invention is described hereunder in some detail with reference to and as illustrated in the accompanying drawings, in which:

FIG. 1 is a substantially flat unitary moulding of polymeric material,

FIG. 2 is a perspective section view of a strainer box formed from the moulding of FIG. 1 by folding along the dotted lines indicated thereon, and also showing the strainer box located over a portion of a water distribution pipe containing an outlet aperture in its wall, and FIG. 3 is a section through the ground, drawn to a much reduced scale, showing the manner in which the irrigation system is utilised.

DETAILED DESCRIPTION OF THE PREFERRED EMBODIMENT

Referring first to FIG. 1, a unitary moulding 10 of polymeric material (for example polyvinylchloride) comprises a plurality of panels, there being a top panel 11, a bottom panel 12, two side panels 13 and 14, and two end panels 15 and 16. Each panel is foldable with respect to the next panel, and as shown in FIG. 1, the panels 11, 15 and 16 contain apertures all designated 18, while the panels designated 13 and 14 are provided with projections 19.

The strands generaly designated 20 intersect one another to form an open mesh as illustrated in FIG. 1. However, there are two pairs of strands 20, one pair in each of the end panels 15 and 16, which are spaced apart and these form a respective pair of slots 21, the slots 21 being of such size and shape that they can locate over a water distribution pipe 22 (FIGS. 2 and 3). The method of irrigating is to firstly dig a trench, then lay the water distribution pipe 22 in the trench with a plurality of outlet apertures 25 extending through its wall at spaced intervals as shown in FIG. 3. The panels of the unitary moulding 10 are folded up to form an open box, the water distribution pipe 22 located in the slots 21, the box filled with gravel 26 (or other particulate material), the top panel 11 closed over and interengaged over the projections 19, and the trenches then filled in. The plants 28 to be irrigated are planted adjacent the respective strainer boxes. The water for the water distribution pipe 28 is recieved from a main pipe designated 29 in FIG. 3.

A consideration of the above embodiment will indicate that the invention has many advantages:

(1) There is no build up of algae as is often the case when emitters are used.

(2) There is no significant change of the pH balance usually associated with build up of algae.

(3) A more gradual absorption of fertilizer, and a longer lasting effect of fertilizing can be achieved by using dry fertilizer around the plant. Fertilizer added to the irrigating water can be used as a booster, if desired, from time to time, as well as for general fertilizing.

(4) There is no need for filters since the outlet aperture 25 can be relatively large (for example a 4 mm diameter hole is suitable).

(5) The system is found to be virtually maintenance free and requires much less attention than any other known type of irrigating system.

(6) Since the watering system can be underground, a more even water temperature can be maintained, and this has been found to be of surprising benefit to a plant.

(7) Because of the penetrating effect of the strainer boxes, a stronger root system will develop resulting in a better plant, flower and fruit.

There will be very little loss due to evaporation of water.

The watering time can be reduced considerably below that of drip or spray irrigating and the water consumption is much less than flooding.

In trials conducted in Alice Springs area of the Northern Territory of Australia over a period of a year (including all four seasons) a rose garden of twenty bushes watered through strainer boxes recieved an average of 200 liters per watering in 30 minutes, producing flowers of show quality all the year around. To get the same result by flooding twenty rose bushes, 1600 liters of water were used, most of it wasted on space between the bushes, and the time taken was 80 minutes. The invention was found to require the use of less fertilizer.

Various modifications in structure and/or function can be made by one skilled in the art to the disclosed embodiments without departing from the scope of the invention as defined by the claims.

I claim:

1. A method of irrigation comprising the steps of
forming at least one outlet aperture in a wall of a water distribution pipe,
forming at least one strainer box from a unitary moulding having a plurality of foldable walls at least some of which comprise strands intersecting at cross-over points to form an open mesh, but the strands of each of two pairs of strands being spaced apart to define a pair of open-ended slots, the two slots extending into opposite walls of the box and being of such size and shape as to locate the box over the pipe,
folding the walls of the box so as to thereby effect the location of the box over the pipe,
placing particulate material into the box and folding a top wall of the box over the opposite walls and thereby retaining the box to the pipe with the particulate material surrounding a portion of the pipe containing the outlet aperture, and
distributing irrigation water through the pipe and the aperture therein into the box to percolate through the particulate material.

2. A method according to claim 1 comprising the step of forming a plurality of apertures spaced from one another along the pipe, each aperture having a respective folded strainer box with particulate material therein.

3. A method according to claims 1 or 2 comprising the step of at least partly burying the water distribution pipe in the ground.

4. A method according to claims 1 or 2 comprising the step of at least partly burying the strainer box in the ground.

* * * * *